Patented June 16, 1953

2,642,454

UNITED STATES PATENT OFFICE 2,642,454

PROCESS FOR MAKING NITRILES

John E. Mahan and Stanley D. Turk, Bartlesville, Okla., assignors to Phillips Petroleum Company, a corporation of Delaware No Drawing. Application November 23, 1949, Serial No. 129,192

2 Claims. (Cl. 260—465.3)

This invention relates to a process for the preparation of nitriles. In some of its more specific aspects, it relates to the preparation of acetonitrile and/or other nitriles by the interaction of ammonia with saturated hydrocarbons, i. e. paraffins and/or cycloparaffins (naphthenes), having not in excess of ten and not less than two carbon atoms per molecule.

Heretofore the application of acetonitrile in the field of industrial chemistry has been retarded due to the lack of an economical synthesis of this potentially valuable material. In addition to the classical applications of acetonitrile as an organic intermediate, its use in vitamin synthesis has been reported. Furthermore, because of its stability under a wide range of conditions, the application of acetonitrile as a specialty solvent merely awaits an efficient and economical method of synthesis. The higher aliphatic nitriles, such as propionitrile and butyronitrile, are also valuable solvents and intermediates, as are the aromatic nitriles, for example benzonitrile. Conventional laboratory methods of preparing such nitriles, such as the dehydration of acetamide or the interaction of alkyl halides and alkali metal cyanides have been of negligible practical value industrially. One of the most promising syntheses has been the reaction of acetylene and ammonia at temperatures of about 750° F. in the presence of contact catalysts. But, while considerable attention has been accorded to this reaction, it suffers from several disadvantages. In general, reaction conditions in the acetylene-ammonia systems are favorable to the formation of pyridine derivatives. In order to suppress such side reactions, excessively long contact times have been required. A further disadvantage of the acetylene system is the practical necessity of working at low pressures to avoid explosive decomposition of the acetylene.

An object of this invention is to provide a process for the production of nitriles.

Another object is to provide a process for the production of nitriles by the interaction of ammonia with a saturated hydrocarbon.

Another object is to provide a process for the production of nitriles having at least two carbon atoms per molecule by the catalyzed interaction of ammonia with one or more paraffins having from two to ten carbon atoms per molecule.

Still another object is to provide a process wherein a paraffin containing 3, 4, or 5 carbon atoms per molecule is reacted with ammonia in the vapor phase in the presence of certain selective contact catalysts such that acetonitrile is the principal reaction product.

Yet another object is to provide novel catalysts for the reaction of ammonia with propane, butanes and/or pentanes under selected conditions to form acetonitrile.

Other objects and advantages of the invention will be apparent, to one skilled in the art, from the accompanying disclosure and discussion.

In a preferred embodiment of our invention ammonia is reacted with one or more paraffins containing from three to five carbon atoms, inclusive, in the molecule under vapor phase conditions at relatively high temperatures, and preferably moderately low pressures, in the presence of a catalytically active solid contact material comprising an association of cobalt oxide with molybdenum oxide, herein broadly termed cobalt molybdate. The catalyst compositions of the present invention comprise cobalt molybdate, preferably coprecipitated on alumina or other suitable support. It appears to be preferable that the catalyst comprising hydrous alumina gel and cobalt molybdate contain at least about one per cent by weight of cobalt molybdate and more preferably about 5 to 25 per cent by weight of cobalt molybdate. The upper limit will usually be that dictated by economy although a given volume of catalyst containing about 20 per cent by weight of cobalt molybdate is usually as effective as an equal volume of cobalt molybdate per se. In addition to an alumina gel, other metal oxide gels such as zirconia, and titania gels may be employed. Other inert carriers such as clay, bentonite and the like may also be used. If desired, the cobalt molybdate may be used in the unsupported state.

A general method for the preparation of preferred cobalt molybdate catalysts applicable to the present invention comprises the addition of aqueous solutions of molybdenum salts and cobalt salts to an aqueous gel such as an aqueous alumina gel. The material so formed is then dried and crushed or made into pellets of suitable size for convenient use. These catalysts may be employed in fixed bed or fluidized processes. A more detailed description of cobalt molybdate catalysts, employed in practicing our invention, together with some specific methods for preparing same is found in U. S. Patents 2,325,033 (1943), 2,325,034 (1943), 2,393,288 (1946), and 2,417,308 (1947), to which reference is hereby made. As indicated therein, the cobalt molybdate is probably principally in the form of a cobalt molybdate having the possible formula $CoO.MoO_3$, or $CoMoO_4$, rather than being a simple mixture of cobalt oxide with molybdenum oxide. In some cases it may be that at least part of the compound present has the formula $Co_2O_3.MoO_3$. The exact nature is not fully understood, but in any event, the Co:Mo atomic ratios may vary from the 1:1 or 2:1 values indicated by the proposed formulae. Broadly, the Co:Mo atomic ratio will lie within the range of 0.3:1 to 3:1, and preferably within the range of 0.5:1 to 2:1. The preferred type of catalyst is prepared by precipitation in the presence of a previously undried wet gel of a supporting metal oxide, preferably alumina. Example I of the copending application of Mahan, Alf and Potts, filed of even date herewith, Serial No. 129,191, filed November 23, 1949, sets forth one suitable method of catalyst preparation.

The simple paraffins of three, four, and five carbon atoms, i. e. propane, isobutane, normal butane, isopentane and normal pentane (neopentane is also operable), are the preferred reactants in our process, all of these giving acetonitrile as the principal nitrile product. Additionally, small quantities of higher aliphatic nitriles can be recovered, especially when using the 4- and 5-carbon-atom paraffins reactants. Ethane is also a very suitable reactant to produce acetonitrile, although generally requiring higher temperatures than the higher paraffins. Paraffins of more than five carbon atoms up to ten carbon atoms, for example heptane, isooctane, decane, etc., may be used but the acetonitrile yield obtained is generally not sufficient to be of great commercial interest at the present time. The chief value of these higher paraffins lies in producing the less readily available higher nitriles, and some aromatic nitriles, e. g. benzonitrile from heptane, are also produced in some instances. The cycloparaffins ranging from cyclopropane up to 10-carbon-atom alkyl cycloparaffins in which the ring may contain up to seven carbon atoms give limited nitrile yields, some acetonitrile as well as higher nitriles being produced and aromatic nitriles also being formed, the latter especially from alkyl cyclohexanes such as methyl cyclohexane, dimethyl cyclohexane, ethyl cyclohexane, and the like.

The catalysts of the present invention may be prepared in a variety of ways, and are ordinarily employed in the form of pellets or other small particles, through a bed of which the reaction mixture is passed in vapor phase. However, the catalysts may be very finely divided and used in the form of a suspension in the gaseous reaction mixture in accordance with the now well-known techniques of employing powdered catalysts, such as in a "fluidized bed."

Many of the catalysts of this invention are of such nature that they may be applied to other materials, instead of or in addition to the aforementioned metal oxide, which act as supports. Examples of such materials are well known to those skilled in the art, and there may be mentioned pumice, kieselguhr, porcelain chips, and the like. These supporting materials are substantially inactive as catalysts. The catalytic material may be applied to the support by any of the well known procedures, such as by mixing in a ball mill followed by pelleting or pilling, effecting the precipitation of the catalytic material in the presence of particles of the support, and the like. These methods and supports are in addition to the coprecipitation with alumina and other gels discussed herein.

During the nitrile-producing reaction carbonaceous material is laid down on the catalyst, which ultimately makes necessary the reactivation of the catalyst. This may readily be accomplished by subjecting the carbonaceous catalyst to the action of air or other oxygen-containing gases, such as air diluted with flue gases, at an elevated temperature in known manner. The temperature preferably should not exceed 1200° F., and some catalysts will require an even lower reactivation temperature in order to avoid a sintering or fusing of the catalytic surfaces with consequent reduction in activity of the catalyst. A typical reactivation operation involves the use of temperatures similar to those employed for the catalytic operation and for a suitable period of time, such as the same period of time as the catalytic operation. The regenerating gas stream will preferably have an oxygen content of about two to three per cent or up to about ten per cent. Preferably the oxidation treatment is followed by a purging treatment, such as passing over the catalyst a stream of purge gas, for example, nitrogen, carbon dioxide, hydrocarbon gases or the like.

It is preferred that the internal surface of the catalyst chamber, as well as any preheating apparatus through which ammonia is passed, be made of a material which is non-catalytic towards the decomposition of ammonia. Ceramic materials, aluminum, and other metals and alloys inert towards reactants and products, are satisfactory for fabrication of the reactor and ammonia preheater, if any, or the lining of same.

In accordance with our invention in preferred form, a hydrocarbon feed stock comprising a three to five carbon atom paraffin is admixed with ammonia and the resulting reaction mixture contacted in the vapor phase at an elevated temperature in the presence of one of the catalysts herein described. Propane, butanes, and pentanes are preferred paraffins for use in this process. The paraffins may be present in admixture with other hydrocarbons or inert gases, such as hydrogen or nitrogen, or small amounts of steam; preferably the paraffins are present in the hydrocarbon feed stock in a concentration of at least 80 per cent by volume. The ammonia:paraffin mol ratio is preferably in the neighborhood of 1:1 or greater. The reaction may be carried out at a temperature of from 700 to 1100° F. Pressures may range from subatmospheric to about 500 pounds per square inch gage or somewhat higher. Unlike an acetylene-ammonia reaction mixture, the paraffin-ammonia reaction mixture of the present process is not explosive at moderately elevated pressures. However, too high a pressure is definitely undesirable in our process, because it encourages side reactions which form products other than the nitriles desired. The reaction effluent may be cooled sufficiently to condense normally liquid constituents, the uncondensed hydrogen and ammonia separated therefrom, unreacted paraffin recovered as gas or liquid and the condensed liquid fraction distilled to yield an acetonitrile fraction having a boiling range of about 176 to 180° F. Higher nitriles, and heterocyclic bases in small yield when formed, are recovered in a higher boiling fraction or fractions. Many alternative procedures for handling the hot effluents of the reaction and for separating therefrom the acetonitrile produced, unreacted ammonia and paraffin for recycle, and various by-products for discard or use as desired, will be apparent to one skilled in the art.

A mol ratio of from one to three mols of ammonia to one of saturated hydrocarbon is a desirable ratio to use, although ratios of ammonia to hydrocarbon varying from 0.3:1 to 5:1 and even as high as 8:1 are satisfactory. With all of the paraffins and cycloparaffins, an increase in ammonia:hydrocarbon ratio up to fairly high values, such as 8:1, tends to effect a decrease in carbon deposition on the catalyst with consequent higher ultimate yields based on the saturated hydrocarbon feed and longer runs before catalyst reactivation is required.

The reaction or contact time may vary from 0.5 to 10 seconds. We usually prefer to operate with a contact time in the range from one to six seconds.

Although under certain conditions of operation acetonitrile and/or other nitriles may be produced at temperatures of 1200° F. and above, we prefer to operate the process at temperatures not above 1100° F. Above this level undesirable decomposition into ammonium cyanide and other products is more difficult to control so that satisfactory yields are obtained. Similarly, while in some cases it may be desirable to operate our process as low as 700° F., we prefer to carry out the reaction at 800° F. or above in order to realize the generally greater conversions per pass obtainable. We have found the range 800 to 1000° F. to be the preferred operating range when using any of the preferred $C_3$—$C_5$ paraffins feeds mentioned herein.

The present process does not suffer from pressure limitations as is the case in processes using acetylene. The reaction has been found to proceed satisfactorily at atmospheric pressure. Moderate superatmospheric pressures are usually of great advantage in actual operation of a commercial plant, and in our process we have found that they may be used as desired up to about 500 pounds per square inch gage. At the higher pressures undesirable side reactions become prominent. Preferably, a pressure within the range of atmospheric to 250 pounds per square inch gage is employed.

*Example I*

A run was made wherein a vaporized mixture of ammonia and propane blended in a mol ratio of 1.95:1 was preheated to about 900° F. and charged to a catalyst case containing 125 ml. of cobalt molybdate catalyst. The catalyst was in the form of 1/8 inch pellets having the empirical composition 8.5 weight per cent molybdenum oxide—2.5 per cent cobalt oxide—5.2 per cent silica on activated alumina gel. (The silica was present in the alumina prior to formation of the cobalt molbdate.) The run was made under the following conditions:

| | |
|---|---|
| Catalyst case temperature, °F | 1000 |
| Pressure | Atmospheric |
| Ammonia charged, grams | 181 |
| Propane charged, grams | 241 |
| Ammonia to propane mol ratio | 1.95:1 |
| Contact time, seconds | 1.28 |
| Duration of run, hours | 6 |

Yield of acetonitrile based on propane charged was as follows:

Per pass yield, mol per cent_____ 5.6

Inasmuch as variations of the specific operating conditions, as well as the composition of reaction mixture and the particular catalyst used, are within the broad scope of this invention, it will be understood that the example is offered by way of illustration rather than by way of undue limitation of the process.

We claim:

1. A process for the production of acetonitrile which comprises admixing a three to five carbon atom paraffin with ammonia in relative proportions of from 0.3 to 5 mols of ammonia per mol of paraffin and passing the resulting mixture in vapor phase at a temperature within the range of from 800° F. to 1000° F. and at a pressure within the range of from atmospheric to 250 pounds per square inch gage for a time of from 0.5 to 10 seconds into contact with a catalyst consisting of cobalt molybdate precipitated on alumina gel and having a weight per cent composition of from 5 to 25 per cent cobalt molybdate on the dry basis.

2. A process for the production of acetonitrile which comprises admixing propane with ammonia in relative proportions of from 1 to 3 mols of ammonia per mol of propane and passing the resulting mixture in vapor phase at a temperature within the range of from 800° F. to 1000° F. and at a pressure within the range of from atmospheric to 250 pounds per square inch gage for a time of from 1 to 6 seconds into contact with a catalyst consisting of cobalt molybdate precipitated on hydrous alumina gel and having a weight per cent composition of from 5 to 25 per cent cobalt molybdate on the dry basis, and recovering the acetonitrile so produced.

JOHN E. MAHAN.
STANLEY D. TURK.

References Cited in the file of this patent

UNITED STATES PATENTS

| Number | Name | Date |
|---|---|---|
| 1,920,795 | Jaeger | Aug. 1, 1933 |
| 2,450,675 | Marisic et al. | Oct. 5, 1948 |
| 2,450,676 | Marisic et al. | Oct. 5, 1948 |
| 2,496,659 | Denton et al. | Feb. 7, 1950 |
| 2,496,661 | Denton et al. | Feb. 7, 1950 |